United States Patent [19]

Brender et al.

[11] Patent Number: 5,339,422
[45] Date of Patent: Aug. 16, 1994

[54] SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT

[75] Inventors: Ronald F. Brender, Hollis, N.H.; Michael V. Iles, Basingstoke, England

[73] Assignee: Digital Equipment Corporation, Maynard, Mass.

[21] Appl. No.: 665,752

[22] Filed: Mar. 7, 1991

[51] Int. Cl.$^5$ .......................... G06F 9/40; G06F 9/46
[52] U.S. Cl. .................................. 395/700; 395/375; 395/500; 395/650; 395/800
[58] Field of Search ................. 395/800, 375, 700, 500

[56] References Cited

U.S. PATENT DOCUMENTS

| | | | |
|---|---|---|---|
| 4,454,580 | 6/1984 | Page et al. | 395/375 |
| 4,486,831 | 12/1984 | Wheatley et al. | 395/650 |
| 4,839,797 | 6/1989 | Katori et al. | 395/375 |
| 4,945,480 | 7/1990 | Clark et al. | 395/700 |
| 4,992,934 | 2/1991 | Portanova et al. | 395/375 |
| 5,093,917 | 3/1992 | Campbell et al. | 395/700 |
| 5,146,593 | 9/1992 | Brandle et al. | 395/700 |
| 5,210,832 | 5/1993 | Maier et al. | 395/375 |
| 5,210,874 | 5/1993 | Karger | 395/650 |
| 5,210,876 | 5/1993 | Uchida | 395/700 |
| 5,218,699 | 6/1993 | Brandle et al. | 395/650 |

FOREIGN PATENT DOCUMENTS

| | | |
|---|---|---|
| 358620 | 3/1990 | European Pat. Off. . |
| 387172 | 9/1990 | European Pat. Off. . |

OTHER PUBLICATIONS

Mosley, J., "Simulation on a Budget Avsim51", Electronics World And Wireless World, vol. 96, No. 1655, Sep. 1990, pp. 801–804.

Primary Examiner—Partshotam S. Lall
Assistant Examiner—Viet Vu
Attorney, Agent, or Firm—Gary E. Ross; Barry N. Young; Albert P. Cefalo

[57] ABSTRACT

A cross-domain call jacketing system is provided in a computer system that embodies a first hardware (X) architecture to executing X-code in an X-domain and which simulates at least a second computer hardware (Y) architecture executing Y-code in a Y-domain.

Cross-domain routine calls are Jacketed for services in the cross-domain and for returns after the requested services have been performed. After Jacketing, X routine calls are transmitted for implementation by the simulating subsystem and Y calls are transmitted for implementation in the X domain. Call parameters are transformed from a representation that uses the call conventions of the calling domain to another representation that uses the call conventions of the called domain. Data in the memory is generally globally accessible and the Y calls include data references that require memory access handling in the X domain.

A first Jacketing table is provided for each executable routine in the X domain. A second Jacketing table is provided for each executable routine in the Y domain.

A run-time Jacketing routine is driven by the jacketing tables to drive the call parameter transformations needed to complete cross-domain calls.

13 Claims, 9 Drawing Sheets

SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT

CROSS REFERENCE TO RELATED APPLICATIONS

Reference is made to the following concurrently filed patent applications assigned to the present assignee and hereby incorporated by reference:

Ser. No. 07/666,039 filed on Mar. 7, 1991 entitled IMPROVED SYSTEM AND METHOD FOR EXECUTING MULTIPLE CODES IN A MULTI-ARCHITECTURE ENVIRONMENT WITH CODE DEBUGGING CAPABILITY and filed by Mark A. Herdeg, James A. Wooldridge, Scott G. Robinson, Ronald F. Brender and Michael V. Iles.

Ser. No. 07/666,028 filed on Mar. 7, 1991 entitled SYSTEM AND METHOD FOR AUTOMATICALLY INTERFACING CALL CONVENTIONS BETWEEN TWO DISSIMILAR PROGRAM UNITS and filed by Daniel L. Murphy.

Ser. No. 07/665,888 filed on Mar. 7, 1991 entitled IMPROVED SOFTWARE DEBUGGING SYSTEM AND METHOD ESPECIALLY ADAPTED FOR CODE DEBUGGING WITHIN A MULTI-ARCHITECTURE ENVIRONMENT and filed by James A. Wooldridge, Ronald F. Brender and Henry N. Grieb, III.

Ser. No. 07/666,022 filed on Mar. 7, 1991 entitled IMPROVED SIMULATOR SYSTEM AND METHOD ESPECIALLY ADAPTED FOR CODE EXECUTION IN A MULTI-CODE EXECUTION AND DEBUGGING SYSTEM WITHIN A MULTI-ARCHITECTURE ENVIRONMENT and filed by Mark A. Herdeg and Michael V. Iles.

Ser. No. 07/666,072 filed on Mar. 7, 1991 entitled IMPROVED SYSTEM AND METHOD FOR DETECTING CROSS-DOMAIN INSTRUCTION CALLS AND DATA REFERENCES ESPECIALLY ADAPTED FOR CODE INTERFACE JACKETING IN A MULTI-CODE EXECUTION AND DEBUGGING SYSTEM WITHIN A MULTI-ARCHITECTURE ENVIRONMENT and filed by Mark A. Herdeg, Scott G. Robinson, Ronald F. Brender and Michael V. Iles.

Ser. No. 07/665,886 filed on Mar. 7, 1991 which is entitled FASTER PROCESS FOR DEVELOPING NEW COMPUTER SYSTEMS EMPLOYING NEW AND BETTER PROCEDURES FOR SOFTWARE DEVELOPMENT AND TESTING and filed by Robert V. Landau, James E. Johnson and Michael V. Iles.

Reference is also made to the following concurrently filed patent applications assigned to the present assignee:

Ser. No. 07/666,071 filed on Mar. 7, 1991 entitled IMPROVED SYSTEM AND METHOD FOR PRESERVING INSTRUCTION STATE-ATOMICITY FOR TRANSLATED PROGRAM CODE and filed by Scott G. Robinson, Richard Sites and Richard Witek.

Ser. No. 07/666,025 filed on Mar. 7, 1991 which is hereby incorporated by reference and which is entitled IMPROVED SYSTEM AND METHOD FOR PRESERVING INSTRUCTION GRANULARITY FOR TRANSLATED PROGRAM CODE and filed by Scott G. Robinson and Richard Sites.

BACKGROUND OF THE INVENTION

The present invention relates to multi-code execution and debugging systems and methods within a multi-architecture environment, and more particularly, to code jacketing systems and methods structured to provide cross-domain interfacing during code execution in such systems and methods.

Within a single architecture, programs are commonly divided into multiple source files that are separately compiled into machine instructions within object files. A linker program combines the object files to resolve calls between routines across file boundaries. The output from the linker program is a composite or image file that is executable by the computer hardware for which the image is intended once the image is loaded into memory. In some cases, multiple images may be combined by an image activator or loader to produce a composite image that is loaded into memory for hardware execution.

In order for separately compiled parts of a program to call each other within a single architecture, a set of rules is required to describe how subprogram calls are made. In broadest terms, the calling rules define how information is to be made available to a called subprogram in the absence of detailed information about that subprogram. In addition, the rules define how a subprogram can find information passed to it as part of a subprogram call in the absence of detailed information about the calling program. The calling rules are usually referred to as a calling convention for the architecture to which they apply.

In some applications, there may be multiple conventions in use within a single architecture. Thus, different calling conventions may be employed for different programming languages or for different subsystems. The combination of all of the calling conventions in use within a single architecture may itself be considered a calling convention. Multiple calling conventions make it more difficult to determine when a compatible combination of caller and called conventions is in use, but the nature of problems related to call implementation is restricted to the environment within which the problems arise, i.e., a single architecture.

In the operation of a system that executes multiple codes within a multi-architecture environment, code execution crosses domain boundaries from time to time in accordance with the code instruction list. A new system and method disclosed in the cross-referenced application Ser. No. 07/666,039 and other cross-referenced applications employ multi-code execution in a multi-architecture environment to execute, test, and debug new or modified software designed for a new hardware architecture even though the actual new hardware, a new operating system therefor and/or support software are not available.

In a multi-architecture environment, the implementation of subprogram or routine calls across domains involves different calling conventions in different architectures, and entirely different problems must be addressed. The present invention is directed to a system or method for Jacketing calls that enables and facilitates cross-domain code execution with efficiency and essential transparency in the referenced multi-architecture system disclosed in the referenced application Ser. No. 07/666,039.

SUMMARY OF THE INVENTION

A cross-domain call Jacketing system is provided in a computer system that embodies a first hardware (X) architecture and includes a memory system and a system for executing and debugging multiple codes including a subsystem for simulating at least a second computer hardware (Y) architecture and a subsystem for detecting cross-domain calls.

Cross-domain calls are Jacketed for services in the cross-domain and for returns after the requested services have been performed. After jacketing, X calls are transmitted for implementation by the simulating subsystem and Y calls are transmitted for implementation in the X domain.

BRIEF DESCRIPTION OF THE DRAWINGS

The accompanying drawings, which are incorporated in and constitute a part of this specification, illustrate one embodiment of the invention and, together with the description, provide an explanation of the objects, advantages and principles of the invention. In the drawings.

DESCRIPTION OF THE PREFERRED EMBODIMENT

Figure 1:
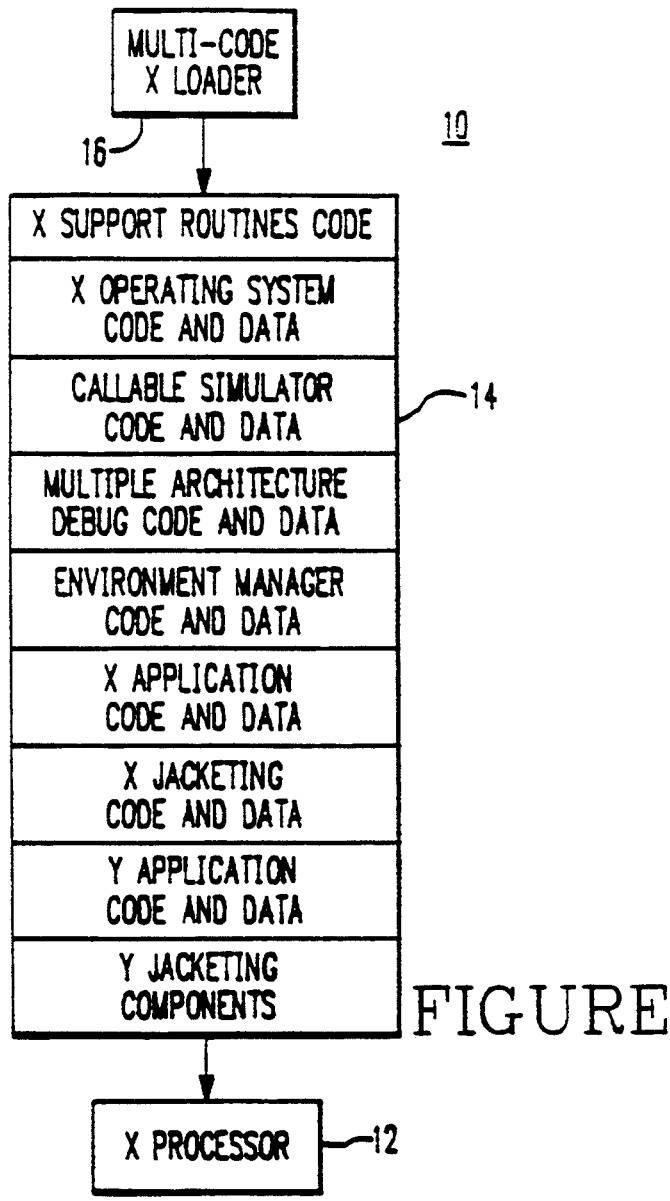
FIG. 1 shows a functional block diagram of a system for executing and debugging multiple codes in a multi-architecture environment.

More particularly, there is shown in FIG. 1 a system 10 that is arranged to execute and debug multiple codes in a multi-architecture environment. An X processor 12 forms a part of a real X architecture that provides for the execution of multiple codes including X code. The X code includes programmed instructions designed to operate in the X architecture.

Generally, the system 10 can be operated to process and execute multiple codes, but in the preferred embodiment, the system 10 is structured for executing two codes, the X code and another code designated as Y code. The Y code includes programmed instructions designed to execute on a machine whose architecture is simulated by the X processes 12. In the preferred embodiment, the system 10 may directly execute a new user level or other level program compiled in or translated to the Y code and, in doing so, make use of X operating system and support software.

As an example of a commercial application of the system 10 for translated X program code, the X code may be a complex instruction set code (CISC) for which a hardware implementation exists, and the Y code may be a reduced instruction set code (RISC) for which no real RISC hardware exists. A possible CISC system is the VAX® computer system manufactured by the assignee of the present application. Reference is made to the cross-referenced application Ser. Nos. 07/666,071 and 07/666,025 which are related to CISC-to-RISC translation systems.

The system 10 further includes a memory system 14 having a general layout for program and data components as shown in FIG. 1. An X loader 16 provides for program code entry into the memory system 14 as more fully described in the cross-referenced application Ser. 07/666,039.

Figure 2A:
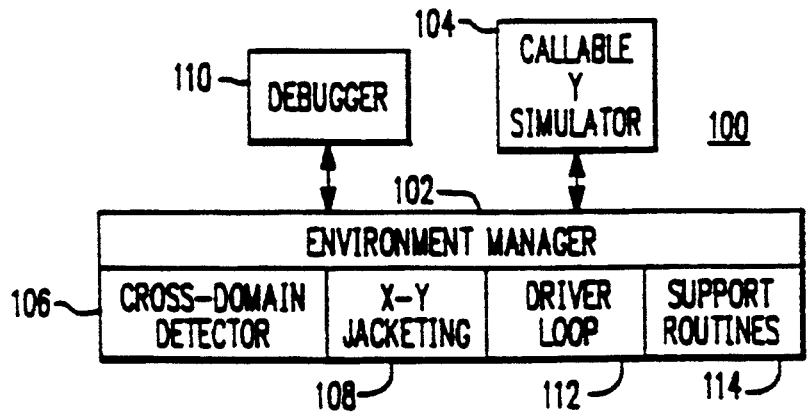
FIG. 2A shows a more detailed functional block diagram of a software system which is employed in the system of FIG. 1 and which includes a call Jacketing system that is structured and operated within an environment manager in accordance with the present invention.

FIG. 2A shows the architecture of a software system 100 which can be executed by the system 10. A callable simulator 104 functions as part of software system 100 (FIG. 2A) within a second architecture (domain, which is preferably a Y architecture embodied in the X hardware. The simulator 104 is structured to emulate Y hardware on the X hardware that may be under development and unavailable. Generally, the simulator 104 executes Y instructions on call from X code through an environment manager 102. Calls may also be made from the Y code through the environment manager 102 for X code execution. For example, the Y code may represent a user level application program and may call for execution of a routine that is located in an X library, or it may make a call requiring operating system processing in the X domain. For a detailed description of the structure and operation of the simulator 104, reference is made to the cross-referenced application Ser. No. 07/666,022.

A debugging capability need not be included in the system 10 where system operation is limited to multi-code execution. However, debugging is provided where the system 10 is to be used for code testing.

A debugger system 110 provides for debugging operations within the Y domain under control of the environment manager 102. In its total operation, the debugger system 110 provides the user with control over the execution of code in either domain so that the whole execution process may be examined and modified to correct malfunctions. Generally, the debugger system provides the procedures needed for debugging operations such as setting breakpoints in both the X and Y domains. The debugger 110 is structured for interaction with the callable simulator 104 within the system 100. Reference is made to the cross-referenced application Ser. No. 07/665,888 for a detailed description of the structure and operation of the debugger 110.

A cross-domain detector system 106 is employed by the environment manager 102 to determine when a cross-domain call is made during the execution of either the X code or the Y code. An X-Y jacketing system 108 operates within the environment manager system 102 to provide the X and Y executable instruction interfacing needed to implement cross-domain calls between routines. Reference is made to referenced application Ser. No.07/666,072 for more detailed disclosure of the detector and jacketing systems 106 and 108.

The environment manager 102 exercises supervisory control over the callable simulator 104 and the debugger 110 through the execution of a driver loop 112. Support routines 114 provide various services, especially on request from the debugger 110.

With use of the code translation system and method disclosed in the cross-referenced application Ser. Nos. 07/666,071 and 07/666,025, CISC user level and other X programs can be translated to functionally equivalent RISC Y programs which can be executed on real CISC X hardware by the system 10 for testing and debugging purposes even though operable RISC Y hardware is unavailable.

Advantageously, an X program can be partly translated to Y program code, or a new program can be partly written in Y code for execution with supporting or other X program code, and the mixed X-Y program code can be executed by the system 10 for testing and debugging of both the X and Y codes. The Y code is executed, tested and debugged on the simulated architecture, and the remaining X code is executed, tested and debugged within the native X architecture. With successful testing of the existing Y code, additional segments of X code can be translated for stepped Y code testing and debugging until the X code is fully translated and the Y code testing and debugging is completed. With the use of progressively stepped testing and debugging, the entire testing and debugging process is facilitated.

Overall, a program can be executed and tested for the Y architecture by translating or compiling it into Y code and running the Y code on the callable system simulator. The run-time environment for the Y code is provided by the operating system and run-time libraries executing on the X or native hardware architecture that is included in the multi-architecture system. The composite software thus includes X and Y codes that are properly executed on the combined X (real) and Y (simulated) architectures. In the preferred embodiment described herein, the operating system for the composite software system is structurally included in the X architecture.

The code boundary between the real and simulated architectures is generally open to the system user's needs. For example, the code boundary can be between the program being ported and the X operating system or, as indicated above, it can even be within the program being ported.

The software system 100 generally has application to widely different architectures. The system 100 also has application to architecture-implementation systems that have different operating systems and different calling systems, but such application is facilitated if the architecture-implementation systems have similar operating systems and similar calling standards.

DRIVER LOOP

Figure 2B:
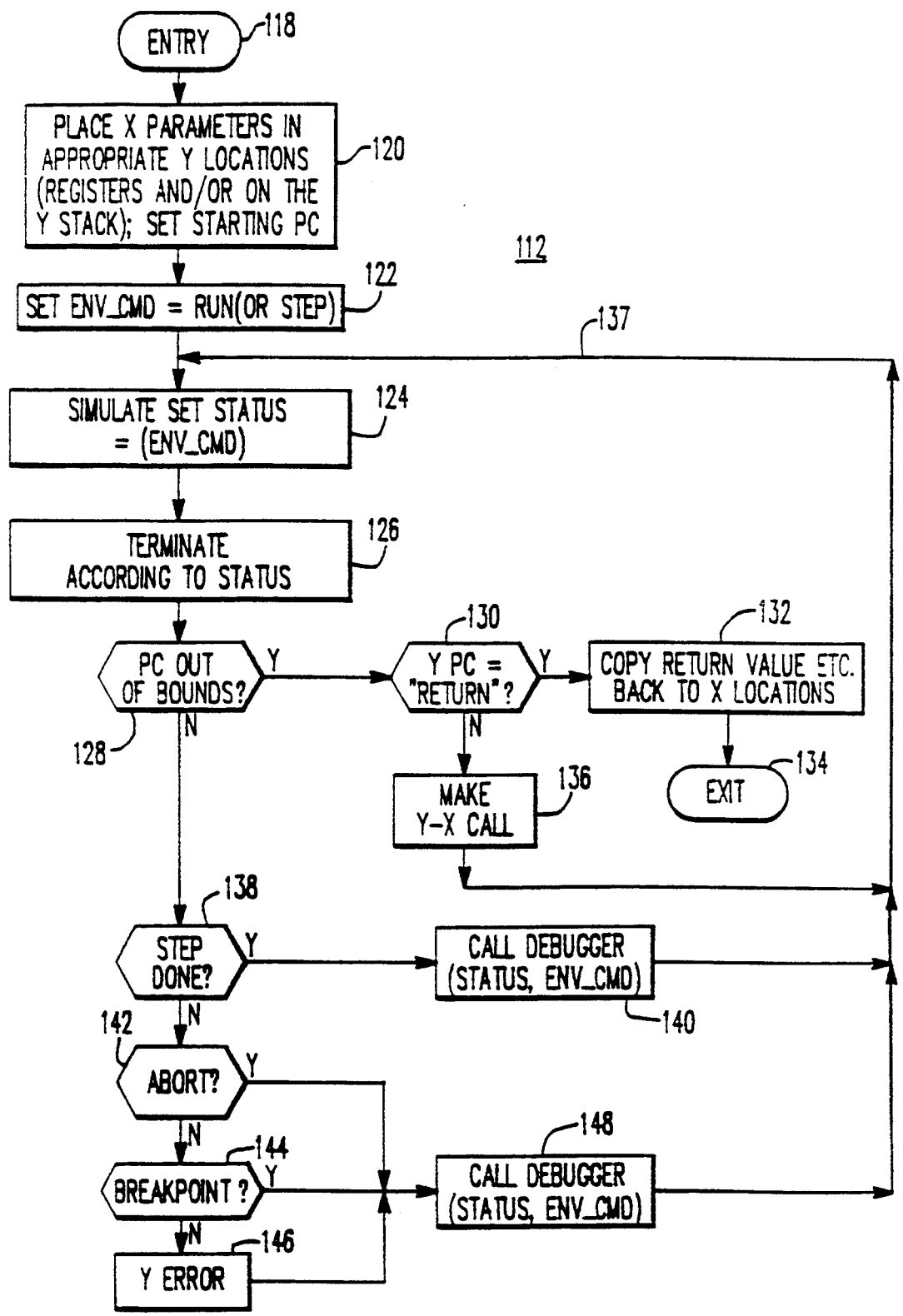
FIG. 2B shows a flow chart for a driver loop employed by the environment manager included as a part of the system of FIG. 1.

In FIG. 2B, there is shown a flow chart for the driver loop 112 which drives the simulation/debugging operation. Entry is made to the loop 112 at block 118 when a call is made from X code, often from X application code for execution of a Y routine through the Jacketing system 108. Jacketing provides interfacing between the X and Y codes to adjust for calling standard differences.

In block 120, parameters are set up as part of the jacketing process, and in particular, X parameters are placed in appropriate Y locations for use during Y code execution. Thus, for normally Jacketed routine calls, jacketing tables are referenced in the jacketing system 108 to determine where parameters come from in the X domain and where the corresponding values must be placed in the Y domain. For automatically-Jacketed routine calls, standard call rules are embedded in special code for this purpose in the jacketing system 108.

A special or distinguished return address is placed in the standard return-address register. The distinguished return address is outside the address bounds previously established as containing Y code. It must also be different from an address that might be used to encode a Y-X call.

In functional block 122, a string variable named ENV_CMD is set by default to RUN mode (continuous instruction execution) or it may be set to STEP mode (instruction-by-instruction execution) by a user selection from the debugger 110. For example, the user may decide to perform maintenance on the particular Y routine that has been called by an X code routine, and accordingly may make a STEP selection for the Y domain.

The simulator 104 is called by block 124 to simulate the Y machine in accordance with the selected mode and the current Y machine state. One or more Y instructions are then executed in the Y domain by the X hardware.

Block 126 next provides for driver loop termination and return according to detected conditions returned from the simulator 104 after its operation has terminated. If the Y program counter is determined to be out of bounds previously established as containing Y code and data as indicated by block 126, a test block 130 determines whether the Y program counter is making a return to the caller X program.

If the Y program counter matches the distinguished return address in the block 130, execution of the Y routine has been completed and is making a return to its X caller. Block 132 then provides Jacketing services by copying values, as appropriate, from the Y result register(s) to the X domain. Normally Jacketed calls are processed with the jacketing tables used to initiate the original call. The previously referenced special Jacketing code is used for auto-jacketed calls. Simulation is complete at this point as indicated by exit block 134.

If the test block 130 determines that the Y program counter corresponds to a jacketing table entry and does not match the distinguished return address, a call is made for execution of an X routine within the current execution process in the Y domain (in the absence of a programming error). Block 136 then provides jacketing services by initiating a Y-X call and having jacketing system 108 access the jacketing tables to obtain the information needed to copy parameters from the Y-domain to the X domain, the address of the X routine being called, etc. When a return is made to the block 136 from the called X routine, the return value is copied into the Y domain and simulation is resumed as indicated by path 137.

With reference again to block 126, if the STEP mode had been requested and the simulation termination is accordingly determined to be a case called "Step Done," as indicated by block 138, functional block 140 calls the debugger 110 to indicate completion of the requested step operation and pass the previously returned status and the variable ENV_CMD. A return to the simulator enables resumed simulation without requiring direct simulator recall by the debugger 110.

The debugger 110 interprets the status and may make a report to the user. Additional simulator step operations may be requested by the debugger 110 in accordance with a previously established internal script or by user selection. The driver variable ENV_CMD is set to RUN or STEP according to debugger requests.

The debugger 110 calls the environment manager 102 to perform other inquiry and status control functions, such as set BREAKPOINT, as more fully considered in the cross-referenced application Ser. No. 07/665,888. In the present embodiment, simulation is controlled only by the driver 112.

If the simulation termination is due to an abort 142 or a breakpoint 144 or Y errors 146, block 148 calls the debugger 110 and operates in the manner described for the block 140.

PROCESS FOR CREATING OPERATIONAL PROGRAM SYSTEM

Figure 3:
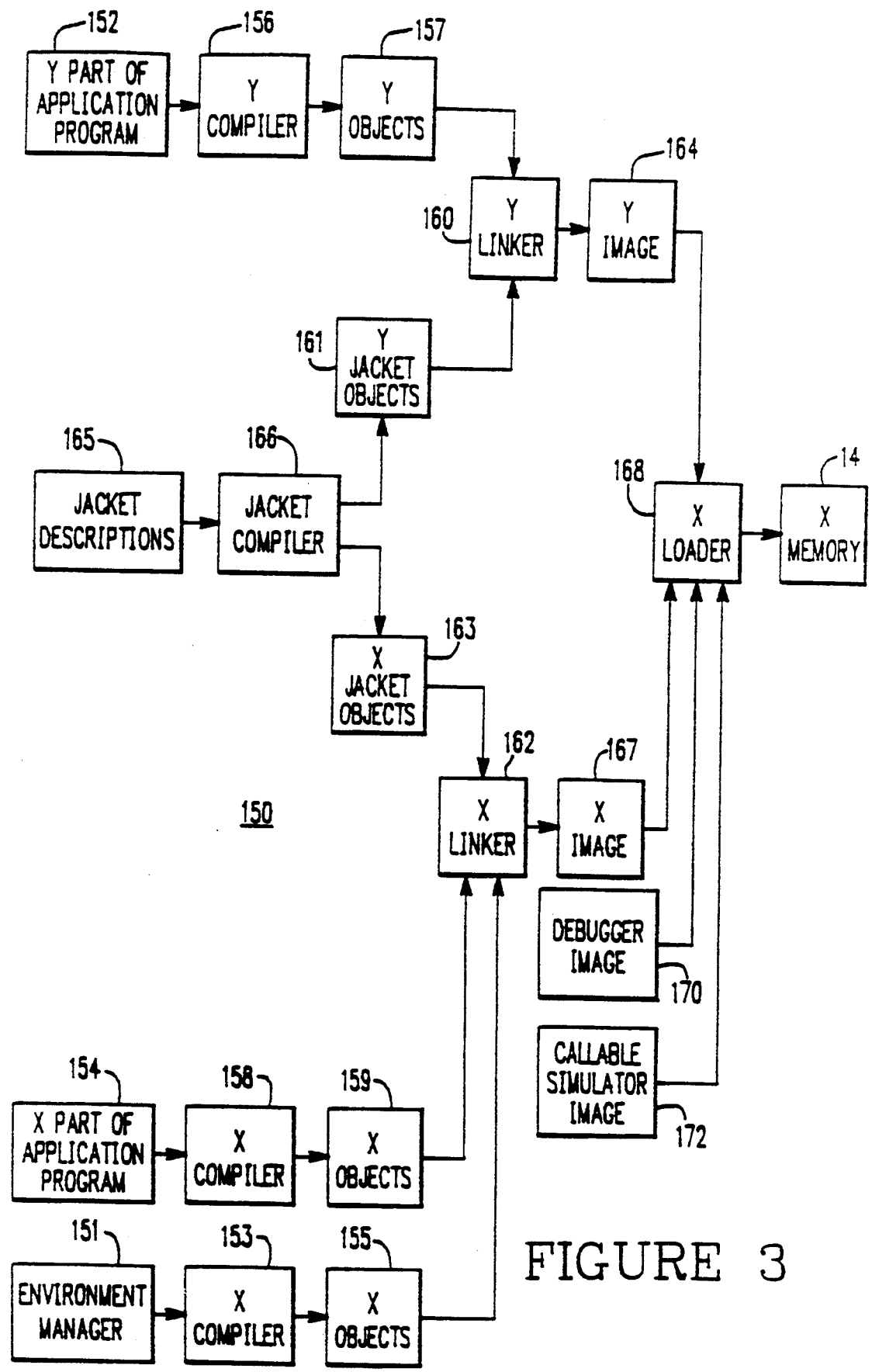
FIG. 3 shows a functional block diagram representing the process by which programs are created for the multi-architecture system of FIG. 1.

A functional block diagram in FIG. 3 represents a process 150 employed in the preferred embodiment of the invention to create the system of programs that are stored in the memory 14 and operate as component parts of the multi-architecture, multi-code execution and debugging system 10. Although the system user may generally enter programs of any level for debugging or other execution, an application program at the user level is employed in the process 150 as the application program to be entered into the system 10 since it clearly illustrates the operation and advantages of the present invention.

As indicated, the application program to be entered is divided into a Y program part 152 and an X program part 154. For example, in migrating an existing X user level program to the Y architecture well in advance of the availability of Y hardware and its operating system, a modular or other part of the X program may be translated to Y code that forms the Y program part 152. After the two program parts 152 and 154 are entered into the system 10, debugging can be performed on the Y program part 152.

Subsequently, an additional modular part of the X program can be compiled to a new Y program part which is then entered with the debugged Y program part and the remaining X program part for debugging of the new Y program part. This modular or phased debugging process makes debugging more manageable and more convenient for several reasons including the fact that the full functionality of the final image is available to the ported Y module 152. The phased process is continued until the entire X program is converted to an equivalent debugged Y program.

In addition to enabling advance debugging as previously described, the present invention greatly facilitates the debugging process itself. Generally, user level code for the X and Y and, if desired, other architectures may be freely intermixed for execution and debugging by systems embodied in accordance with the invention.

The Y application program part 152, which may include multiple source files corresponding to respective routines or subprograms, is processed by a Y cross compiler 156 to produce one or more Y object files 157. Similarly, an X compiler 158 processes the X program part 154 to produce an X object image 159 having multiple X object files.

A cross linker program 160 combines Y object files by providing cross file linkages between calling and called Y object files (routines) in accordance with applicable calling conventions for the Y architecture. An X linker program 162 similarly combines X object files.

Since Y object files (routines) may make cross domain calls for execution of X object files (routines), and vice versa, an X-Y call interface is integrated with the Y object files and the X object files respectively by the linkers 160 and 162 thereby facilitating cross-domain execution switching at run time. Specifically, Y jacket object files 161 and X Jacket object files 163 are respectively linked with the Y object files and the X object files by the linkers 160 and 162.

In the present embodiment, source code 151 for the environment manager 102 is compiled at 153 to generate X object files 155. The X linker 162 also links the environment manager object files 155 with other object files in producing a con. Dined X image 167.

The Y cross linker 160 combines Y object files together into a single image. A Y image generated by the Y linker contains Y code but is externally formatted as a standard shareable X image.

In the preferred embodiment, a global data system is employed so that each code X or Y can generally access all data. However, protected locations may require special processing for cross-domain access from the Y domain.

To build the call interface, Jacket descriptions 165 are prepared by the user for each X and Y routine on the basis of knowledge of the applicable X and Y call conventions. In the preferred embodiment, a pair of jacket descriptions is prepared for each routine, i.e. one that applies to the calling domain and one that applies to the called domain.

A jacket compiler 166 processes the jacket descriptions to build jacketing tables which can be interpreted by other software at runtime to effect jacketing operations needed for cross-domain execution. A more complete description of jacketing and cross-domain call detection is provided in the cross-referenced application Ser. No. 07/666,072.

An X loader or image activator 168 links the Y image 164, the X image 167, an image 170 for the debugger 110 and an image 172 for the simulator 104. The output from the X loader 168 that is loaded into the X memory 14 and formed into executable code.

CROSS-DOMAIN CALL JACKETING SYSTEM

Figure 4:
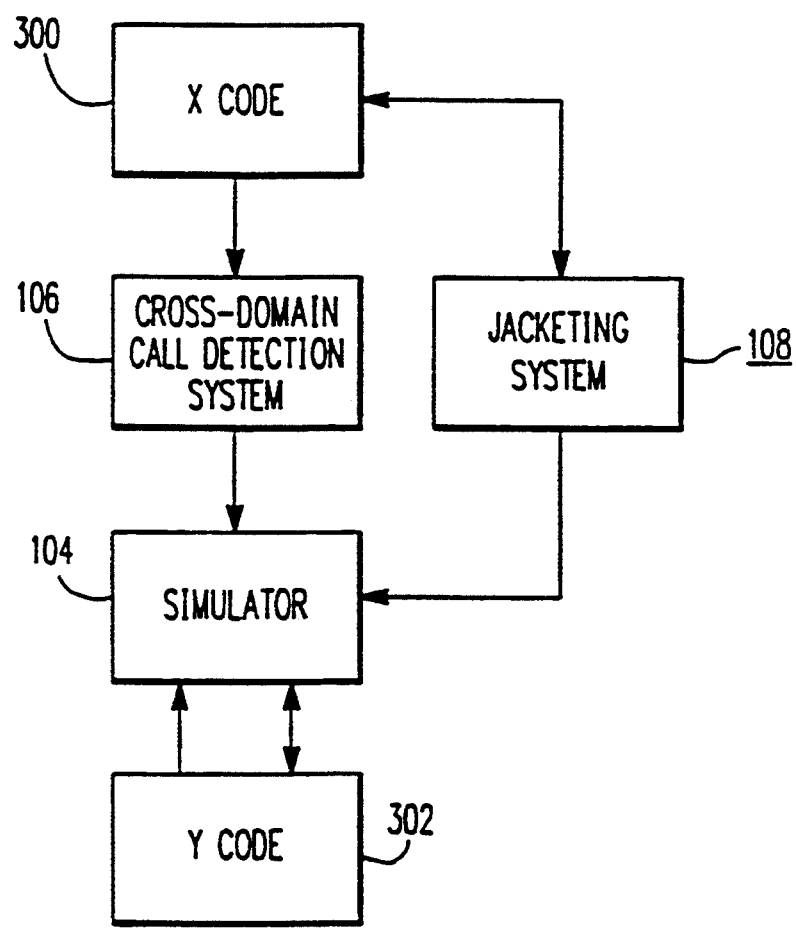
FIG. 4 shows a functional block diagram representing the software and hardware structure of the Jacketing system of FIG. 2A.

A functional block diagram shown for the preferred embodiment in FIG. 4 focuses on the manner in which cross-domain interfacing is achieved, and demonstrates the manner in which cross-domain execution calls are detected, jacketed, passed for execution, and returned upon completion of execution. When X code 300 reaches a point in code execution by the X processor 12 where a switch is to be made for execution of a routine in the Y domain, the call detection system 106 employs a hardware fault interrupt or a stub routine structured into the X code at link time to detect the call for execution of a Y routine. The jacketing system 106 jackets the call as the driver loop 112 initiates operation of the Y simulator 104 for execution of the targeted Y routine.

In the preferred embodiment, the X call may be detected by a hardware trap or by a stub routine structured at link time into the X code. Once a routine call is detected, the jacketing system 106 jackets the call by reference to the Jacketing tables. The simulator 104 accepts the jacketed call and executes the called routine in the Y code 302 in the Y domain.

A request for a return to the X domain is made by the simulator 104 and call detection and Jacketing provides for sending the call return to the X domain. Execution of the X code 300 by the X processor 12 is then resumed.

If the Y code 302 is being executed by the simulator 104 and a point is reached in the Y code where a switch is to be made for execution of a routine in the X domain, the call detection system 106 detects the cross-domain call and causes the simulator 104 to initiate Jacketing of the call. In the preferred embodiment, the Y call is detected by an address range routine or by a common stub routine structured at link time into the Y code. Again, the jacketing system 108 jackets the call by reference to the jacketing tables.

The targeted routine in the X code 300 is then executed by the X processor 12. Once the execution of the targeted routine is completed, a return call is detected and Jacketed and sent in the X to Y direction across the domain boundary in the manner previously described. The Y simulator 104 restarts to resume execution of the Y code 302.

The call Jacketing system 106 also jackets calls for processing of cross-domain data references. In this embodiment, such data references may include a request from the Y domain to read or write certain memory locations assigned to the X domain (even though the X and Y memories are generally globally accessible).

Reference is made to the cross-referenced application Ser. No. 07/666,072 for more detail on the cross-domain call detection system.

RELATIONSHIP OF CALLING CONVENTIONS TO CROSS-DOMAIN JACKETING

A calling convention generally specifies the following characteristics of a subprogram call:

The instruction(s) used by the caller to pass execution control to the called subprogram together with the corresponding instruction used by the called instruction to return execution control to the caller:

The choice of instructions used may dictate, or may be supplemented by, a machine location where the caller provides a return address to be used for the return step. The return address location is typically a particular register or a specific location relative to an execution stack. Some architectures may have more than one instruction call pair, or even may use the same instruction for both purposes.

The manner in which basic machine state, especially register state, is managed:

Machine registers most commonly may be used to pass parameters into the called program; return values to the calling subprogram; provide unrestricted scratch memory for the called subprogram; operate as preserved registers where the original value is preserved in some way and restored to its original location when the subprogram returns; or for program wide use without availability for specific use by the called subprogram.

The location where actual parameters of the call are placed for use by the called subprogram and where any results of the call are made available to the caller:

Parameters may be placed in machine registers, pushed onto the execution stack or communicated by in memory argument blocks that are themselves located through some characteristic of the basic call mechanism (such as the return address).

The manner in which actual parameters of the call are transmitted and how any return results are transmitted A parameter may be transmitted by passing its value or by passing the address of a memory location that contains the value or in various other ways. The manner in which parameter values are represented:

Floating point values most commonly have two or more representations including single and double precision. There may also be multiple sizes of integer values, various kinds of decimal representations, etc.

The general purpose of a calling convention is to make it possible to compile a subprogram SA that calls a subprogram SB without any knowledge of SB (except that its name is SB), and, conversely, to make it possible to compile a called subprogram SB without any knowledge of the subprogram SA or any of its other callers. The calling convention can thus be viewed from two sides of the domain boundary: first, the rules that a caller must follow and what it can and cannot assume about how the called subprogram will perform; and second, the assumptions that a called subprogram can make about information provided by the caller and the rules the called routine must follow when executing and returning results.

In the present embodiment, a multi-architecture environment is provided and a subprogram SA in the X architecture may make a call to a subprogram SB in the Y architecture or vice versa. To achieve X-Y cross-domain code execution, the state of the Y architecture machine must be set as though the call had been made from the Y architecture prior to starting Y code execution. After the subprogram SB has been executed in the Y domain, the final state of the Y machine must be interpreted and used to modify properly the state of the X machine to what it would be if the call had been completed totally within the X architecture.

JACKET TABLES

The jacketing of calls from one domain to the other domain is effected by run-time routines that are driven by the jacket tables created previously at image build time, as previously indicated. The run-time Jacketing code and data are produced by the jacket description language (JDL) compiler and combined into the X and Y codes by the linkers.

Jacketing requires that knowledge of all of the relevant calling convention characteristics for each subprogram in each domain be available to the Jacketing mechanism. In the preferred embodiment, the previously noted Jacket tables are created and integrated with the X and Y images at link time so that calling routine and called routine conventions can be determined for proper call passing across the domain boundary between any X or Y routine and any Y or X routine.

Each subprogram may have calling convention characteristics that are different from the characteristics of all other subprograms. The previously referenced Jacket descriptions are accordingly prepared for the respective subprograms in the X and Y codes.

Generally, the jacket descriptions describe Y routines that may be called from the X domain and X routines that may be called from the Y domain. Each description lists the described routine by name and defines the manner in which parameters are passed to and from the routine as previously indicated. Where the calling mechanism for a routine conforms to the calling standard for the domain in which it is located, no linkage description need be associated with that routine.

Each routine described has two descriptive parts, one for the calling domain side and one for the called domain side (the latter being where the actual code is found). Either or both of these descriptive parts can be implicit. For example, if no explicit linkage is given for a domain, an implicit linkage description is assumed to reflect the calling standard for that domain. Generally, the choice of calling convention characteristics for one domain may be different from those in the other domain.

It is also noteworthy that where the basic Jacketing mechanism is unable to meet the needs of a particular call, provision is made for the user to specify a dedicated jacketing routine through linkage files. In effect, the manual jacketing routine capability is a "safety valve" for unusual and rare cases that cannot be adequately treated by the main jacketing support described herein.

In the Jacket tables, the jacket for each call from any one routine in one domain to any other routine in the other domain is thus defined by a pair of jacket description files. One file of the pair describes how the outgoing caller references the target, and the other file describes how the incoming routine expects to be referenced. Call linkage is implemented at run-time by the jacketing code.

For example, in the subprogram SA in the X architecture, the first parameter in a call of subprogram SB may be passed in a register specified to be register 2. On the other hand, the first parameter of the subprogram SB in the Y architecture may be passed in machine register 23 or on the Y execution stack or in some conventional memory location. The jacket description files reflect this register difference and thereby enable passing of the first parameter to satisfy the register passing standards of both domains.

To create the Jacket tables from the jacketing descriptions in the multi-architecture environment, it is not feasible to use conventional programming language compiling procedures for making choices among various calling convention alternatives because the results of such choices is represented only indirectly and implicitly in the generated code. Thus, the calling convention characteristics are not represented in a form that can be located and interpreted by other software.

Accordingly, in the preferred embodiment, jacket descriptions are prepared and compiled into tables that make it possible for other software to locate and interpret calling convention characteristics in the compiled code. A jacket description language JDL is preferably employed to write the descriptions for each subprogram.

Generally, conventional X compilers are employed and there is essentially no limitation on the programming languages that may be used with them. The same is true for Y cross compilers except that a normal compiler for a dynamic or computed call would use code sequences that would not allow for detection of a call from the Y to the X domain. To make such detection possible in the call detection system 106, the conventional Y cross compiler is provided with a special run-time support routine called a "common stub".

In the preferred embodiment at run-time, the con, non stub makes an appropriate bit 12 check in the bit entry mask and then either continues in the Y domain or initiates a Y-X cross domain call. Thus, Y source code advantageously does not need to be changed for use in mixed code environments non-mixed or even hardware environments.

Figure 7A:
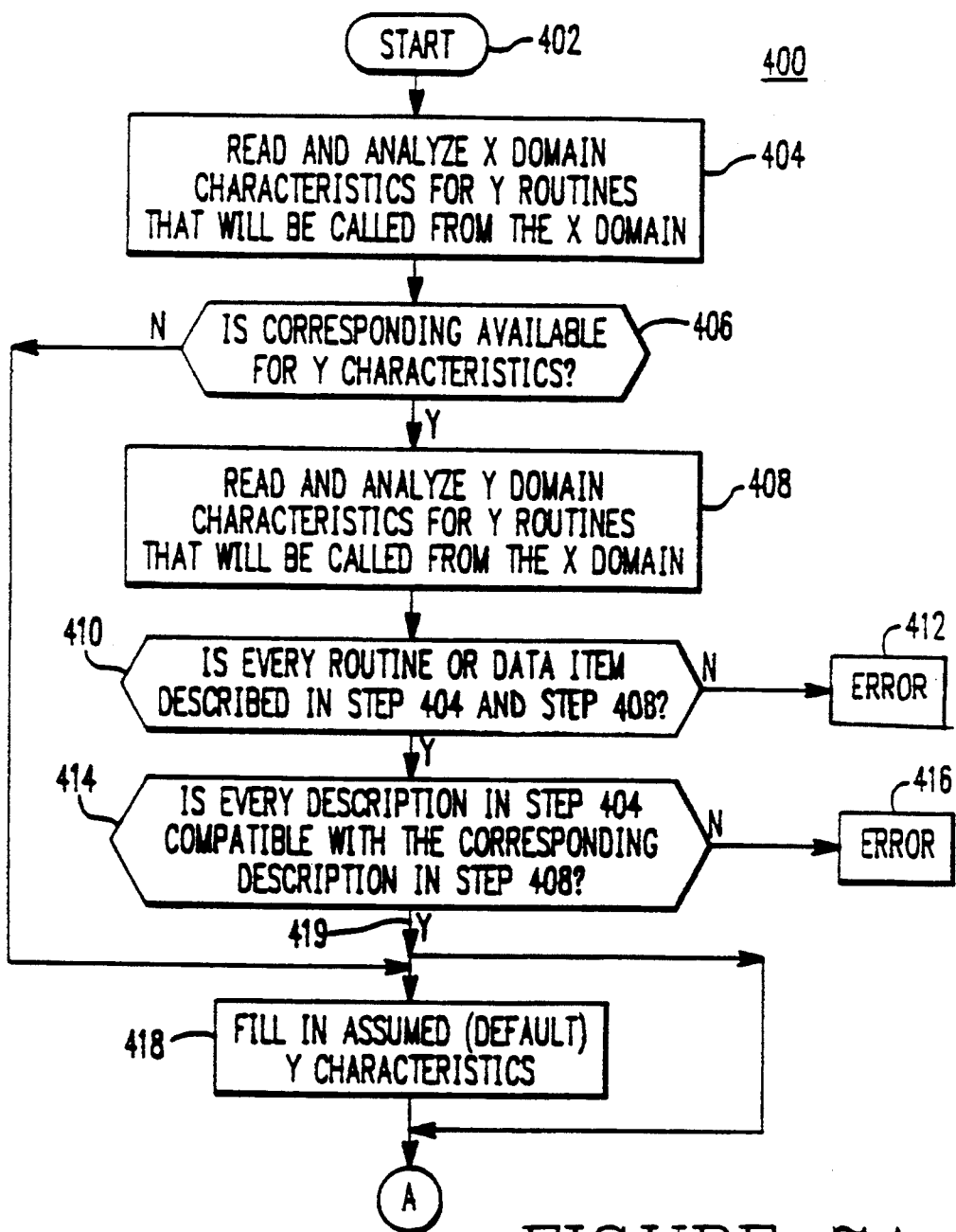
FIGS. 7A–7C show a flow chart for compiler routines employed in the jacketing system to create Jacket tables from jacket descriptions.
Figure 7B:
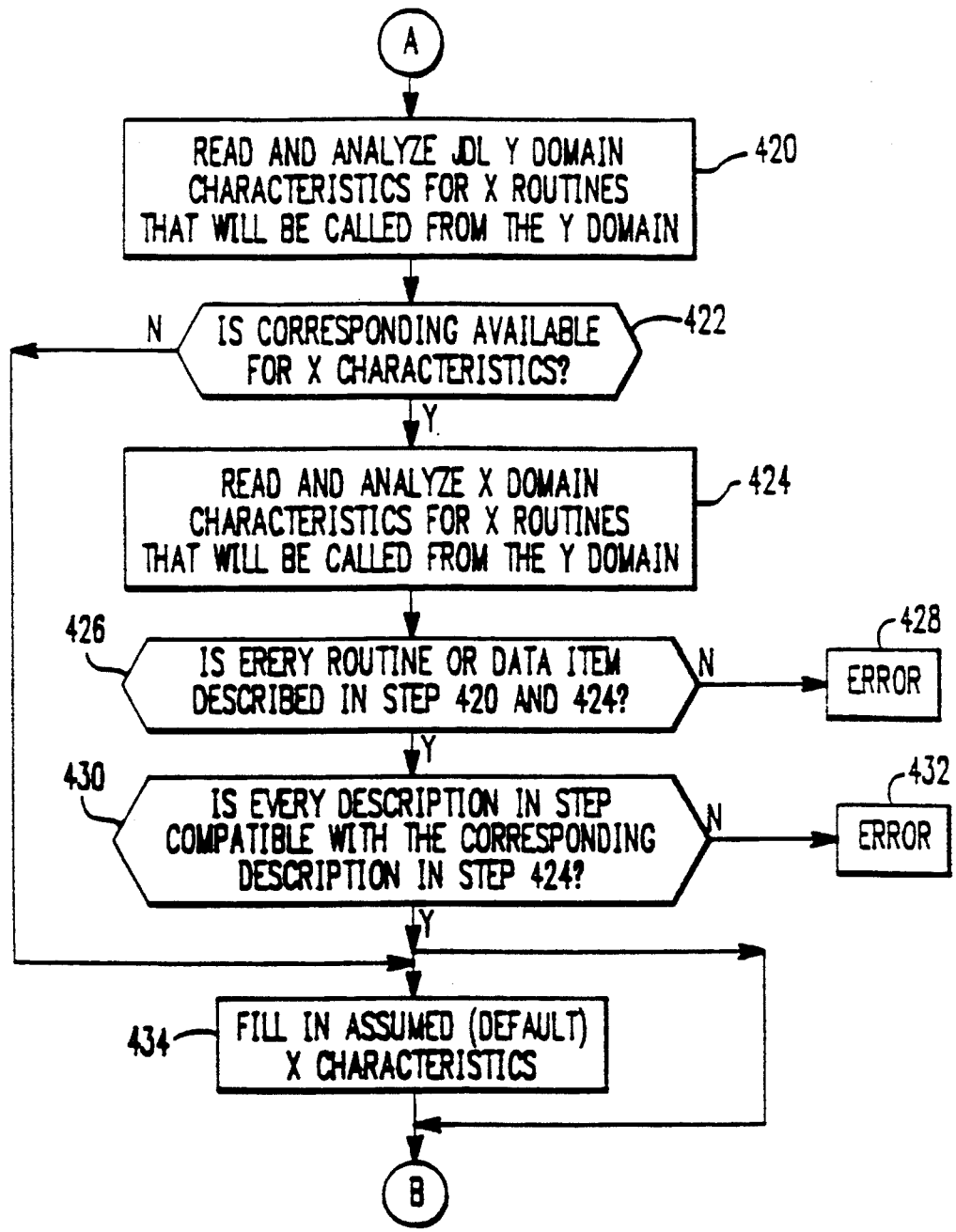
Figure 7C:
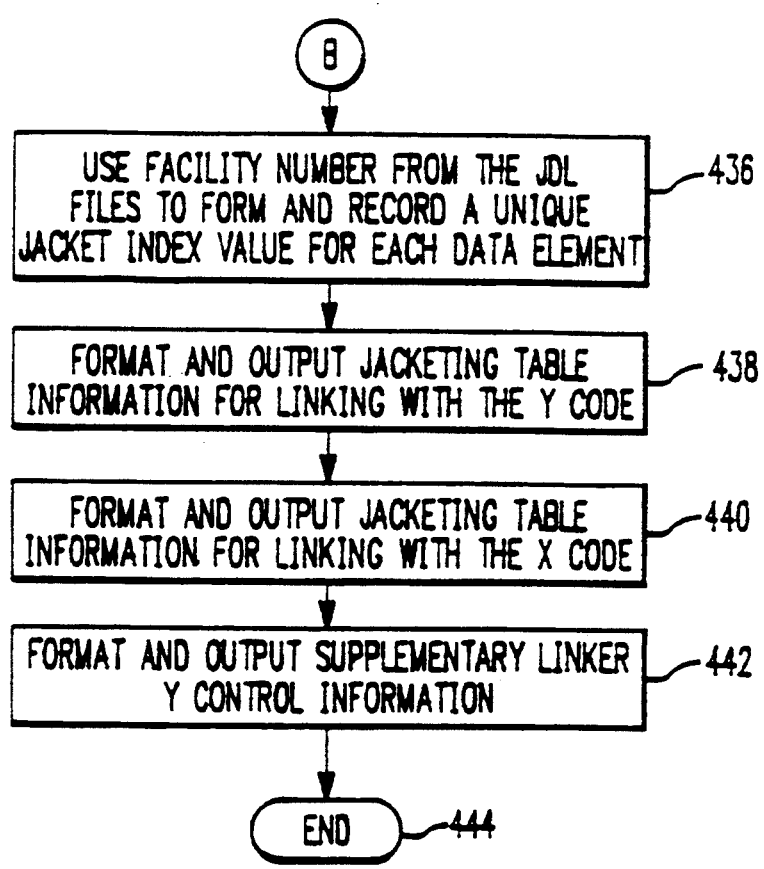

The creation of jacketing tables from jacket descriptions is shown in greater detail in FIGS. 7A–7C. Thus, a jacket compiler routine 400 is entered in start block 402, and block 404 reads and analyzes the JDL information specifying X domain characteristics for Y routines that will be called from the X domain. The results of this analysis are temporarily stored within the jacket compiler in the form of an internal table of partial X-Y jacket descriptions.

Test block 406 next determines whether the same JDL description file is available to specify Y characteristics. If so, block 408 reads and analyzes the JDL information in that file. The results of that analysis are combined in the internal table of the JDL compiler to form complete X-Y jacket descriptions.

In block 410, a test is made to determine whether every routine or data item described in the first JDL file is also described in the second JDL file. If not, a partial X-Y jacket description remains and an error 412 is generated. If so, test block 414 tests for compatibility of the two JDL descriptions. Failure of compatibility results in an error 416. Otherwise, the routine 400 follows path 419 to functional block 420.

Block 420 is also entered from block 418 if the JDL X domain characteristics read in the block 404 are tested in block 406 to be not correspondingly available for the Y domain. In block 418, assumed or default Y characteristics are recorded for each routine or data item described in the first JDL file to create a complete jacket description.

In blocks 430 through 434, a procedure that is essentially inverse to the procedure described for the blocks 402 through 418 is followed for X routines called from the Y domain.

Thereafter, in block 436, the facility number read from the JDL files (or zero if not specified) is used in forming and recording a unique Jacket index value using successive numbers for each routine described in the complete set of JDL descriptions. Each data element is also processed in this way.

Jacket table information is next formatted and generated for output in block 438 for linkage with the Y code. Block 440 does the same for jacket table information to be linked with the X code.

Supplementary Y control information is formatted and generated for output in block 442 for use during the linking of the Y code. In particular, out-of-range Jacket index definitions for Y-X calls and Y-X data accesses are processed for control purposes. After execution of the block 442, the routine 400 ends at block 444.

In the preferred embodiment, the jacket descriptions are organized into a file system in which a distinct file group contains all of the descriptions for each subprogram for a particular architecture. Thus, the files are conveniently grouped so that descriptions that apply to subprograms in the X architecture are separated from descriptions that apply to subprograms in the Y architecture.

The file system for the Jacket descriptions facilitates access and maintenance of the descriptions by human users. Other file systems may be employed, and in any case the jacket descriptions are combined as tables in the loaded image to be simultaneously available to the jacketing system 108 at run-time.

A unique index value is assigned to each designated routine. The index values are accordingly employed at run-time to locate calling and called routines in the Jacketing tables when jacketing service is requested for a detected cross-domain routine call from the X code or the Y code.

The index value provides for an encoding in which one part is a number corresponding to a facility and another part is a number assigned by the JDL compiler for each routine within a facility. A facility is a collection of routines and data that are supplied in executable form as a pre-linked unit, or in other words, an executable image. A unique number is assigned to each facility and accordingly serves as an encoded name for the facility.

The index values and their corresponding table entries for one facility are kept distinct from those of other facilities by including the number in the index value and including the index value in the corresponding table entry. This makes it possible to compile the JDL descriptions for one facility independently of other facilities and later combine several jacket tables at link-time. A pass over the total set of jacket tables during program initialization makes the final connections needed to make use of the combined set of table entries.

Figure 6A:
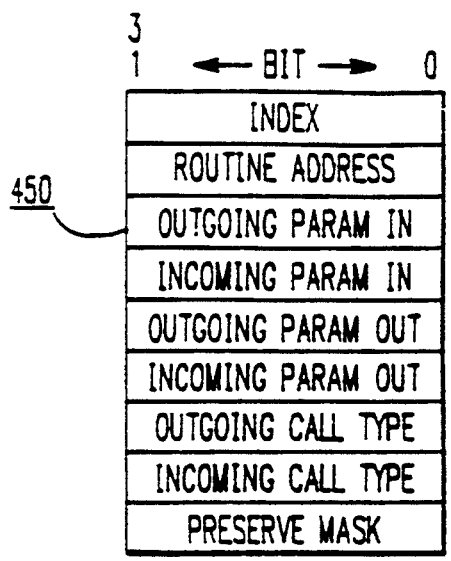
FIGS. 6A and 6B respectively show diagrams representing a routine jacketing table and an index field therefor employed in making information transformations for cross-domain routine calls in the Jacketing system.

In FIG. 6A, there is shown a routine jacket table 450 for which the following applies:

| | |
|---|---|
| INDEX = | (See encoding below) |
| ROUTINE_ADDRESS = | Routine entry point address |
| OUTGOING_PARAM_IN = | Input parameter block address, outgoing |
| INCOMING_PARAM_IN = | Input parameter block address, incoming |
| OUTGOING_PARAM_OUT = | Output parameter block address, outgoing |
| INCOMING_PARAM_OUT = | Output parameter block address, incoming |
| OUTGOING_CALL_TYPE = | Code for the outgoing call type |
| INCOMING_CALL_TYPE = | Code for the expected call type |
| PRESERVE_MASK = | Mask of registers expected preserved |

Figure 6B:
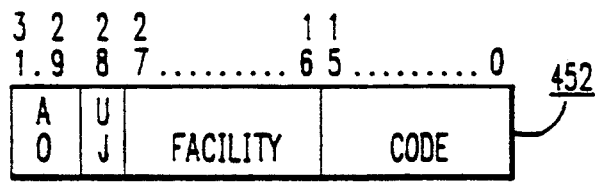

FIG. 6B shows an index field 452 that is encoded as follows:

| | |
|---|---|
| CODE (16 bits): | Item number within facility |
| FACILITY (12 bits): | Facility number |
| UJ (1 bit): | User Jacket Flag |
| AO (3 bits): | Address kind code |
| Address Kinds: | |
| [Bits 30:31 always set to reference a reserved section of address space] | |
| 6  Routine Jacket Entry | |
| 7  Data Jacket Entry | |

Figure 6C:
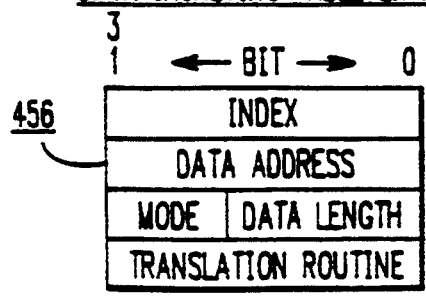
FIG. 6C shows a diagram representing a data jacketing table employed in making cross-domain data references in the jacketing system.

A data jacket table 454 is shown in FIG. 6C. The following applies to it:

| | |
|---|---|
| INDEX = | (See encoding below) |
| DATA_ADDRESS = | Base address of data area |
| MODE \| DATA_LENGTH = | Access mode; Data area size |
| TRANSLATION_ROUTINE = | Address of User Jacket Routine (or 0) |

INDEX Encoding:
Same as for Routine Jacketing.

-continued

DATA_LENGTH (16 bits):
Number of bytes in this data segment.
MODE (2 bits):
Access mode (privilege level) for accessing this data segment. Possible values are:
    KERNL    (most privileged)
    EXEC
    SUPER
    USER    (least privileged, default)
Parameter block encoding:
Each parameter block address points to a sequence of bytes. The first byte contains the number of parameters described (bytes) following. Each subsequent byte is interpreted as follows:
    >=0:    Register number for that parameter position
    <0:    Offset on stack for that parameter position
List of possible call types:
    STANDARD
    CALL
    JSB
    INTERRUPT
    EXCEPTION
Mask of registers expected preserved:
A bit vector. The i'th bit set indicates that register i is preserved by the called routine.

The X linker is a standard X linker. It combines object modules and resolves symbolic references in the classic manner.

An object module that references a routine or data location that is external to itself, includes control information that directs the linker to place the address identified by the external name (for example SIN or FOO) at certain locations within the current module.

Complementarily, an object module that defines a routine or data location that can be referenced from outside itself includes control information that directs the linker that a certain location within itself is potentially identified in other modules by a global name (again, such as SIN or FOO).

When the linker is combining two or more such modules, the symbolic reference in the using module is "resolved". This means that, it is replaced by a direct reference to the now known location in the combined set of object modules.

The Y linker is also essentially a standard cross-linker. It includes the capability of creating an image in a format that is acceptable to the X image activator.

Reference is made to Appendix A herein for a more detailed explanation of the implementation of X to Y and Y to X call jackets.

The jacket description language JDL is a free form super set of the following declarations:
    ident-declaration
    facility-declaration
    linkage-declaration
    routine-declaration
    data-declaration Free form means that the jacketing compiler searches for the listed declarations among the jacket description inputs and interprets only the listed declarations. Anything else is simply ignored.

Reference is made to Appendix B included herein for more detail on the JDL.

An X-to-Y stub routine does two things:

1) Load a Jacket index code onto the execution stack, and

2) Jump to a common entry point in the environment manager to carry out the X-to-Y cross-domain call indicated by that index value.

The "detection" of a cross-domain call is thus performed by the stub structure in the sense that a call is detected when execution has reached a particular stub routine. There is one stub in the X domain for each Y routine that is potentially callable from the X domain (aside from the hardware-detected auto-jacketing flow). Normal compilers are also used for inserting X-Y stub routines.

A limitation might arise only if some compiler used a calling sequence convention with characteristics that could not be described using the JDL. In fact, there are such limitations even for the C language. This is not a fundamental limitation—it merely means that the descriptive power of the JDL needs to be augmented by including additional support cases in the jacketing code part of the environment manager.

JACKETING OF CROSS-DOMAIN CALLS AT RUN-TIME

Two forms of jacketing are employed for interfacing calls from the X domain to the Y domain in the present embodiment:

manual Jacketing and automatic Jacketing.

Manual Jacketing is based on the jacket (linkage) structure produced at image building time. In the present embodiment, the following components are included in the jacket structure:
1. Index values by which each routine is referenced.
2. Entry point stub routines are created at link time to generate cross-domain calls; each stub merges with a common dispatch routine in the jacketing code at run-time thereby passing the index value unique to the called routine.
3. A Jacket table that has entries describing the call type and parameter passing mechanisms to be used for outgoing and incoming routines. At run-time, the jacketing code accesses the table entry for each routine by the index value for that routine.
4. Y image entry points are defined by global symbols different from the name of the called routines so that there is no name conflict between the target Y routine and the entry point X stub routine. The names of called routines are hidden at link time by not being declared globally, and the latter is defined globally to resolve the call and link it into the simulator 104.

Automatic jacketing is achieved without user intervention at image build time. In the present embodiment, it is based on the fact that a direct X call to a Y routine incurs an X operand fault. A handler in the call detection system 106 receives the reserved operand, and the jacketing code then jackets the call for execution in the Y domain. In the preferred embodiment, it is assumed that standard calling conventions are used. Other conventions may be employed, and in that event, a jacket table description may also be provided for use with auto-jacketed calls.

The Jacketing code sends the input parameters from the X domain to the Y domain. In the case of manual jacketing, the jacket tables define parameter transfer. For automatic jacketing, parameter transfer is achieved directly. After completion of simulator execution, the call is completed by a return to the caller in a manner like that employed in making the call.

Calls from the Y domain to the X domain are all designated at build time. Index values are assigned so as to assure that calls from the Y domain for cross-domain execution are outside the Y code address space and thus are illegal. The simulator 104 stops when a cross-domain call generates an illegal address, and the jacketing system then implements the jacketing process in a manner like that described for the X-Y direction.

The jacket structure for the Y-X call includes the following:
1. Index values for the jacket tables.
2. Jacket table entries for call type and parameter passing mechanisms.
3. External symbol resolutions for unresolved references to external locations.

Figure 5:
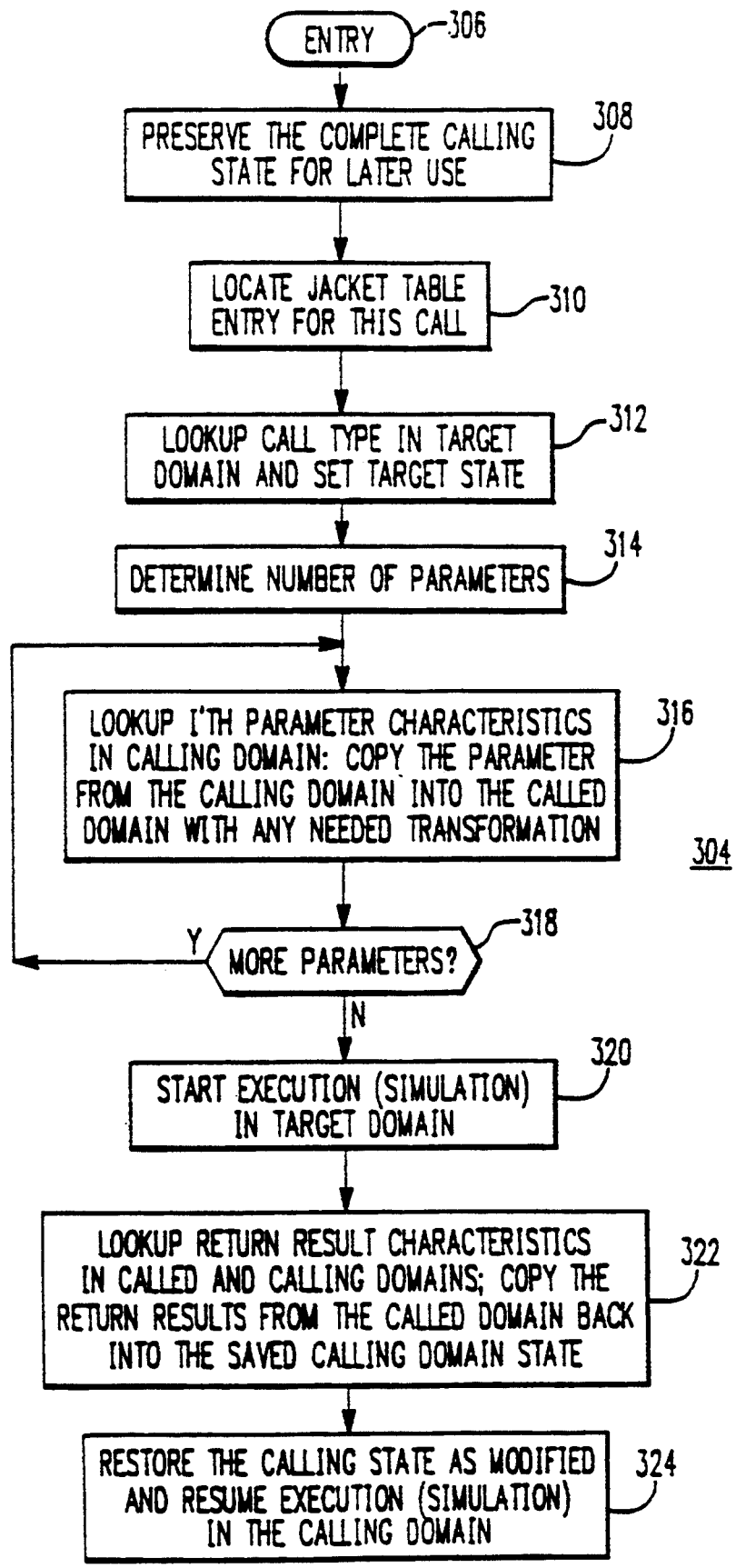
FIG. 5 shows a flow chart for a jacketing routine employed by the Jacketing system to Jacket cross-domain calls at run-time.

In FIG. 5, there is shown a flow chart for a jacketing routine 304 employed by the jacketing system 108 to implement detected cross-domain calls between the X and Y domains. Entry is made at block 306 after detection of a cross-domain call.

A functional block 308 first preserves the complete calling state for later use. With index value use, the jacket table entry for the current call is located by block 310. The call type in the target domain is determined and the target state is set by block 312.

The number of calling convention parameters is determined by block 314. Each parameter is then processed by functional block 316. In particular, each parameter is copied from the calling domain to the called domain with any needed transformation as defined by the jacketing tables on the basis of the entered jacket descriptions.

Test block 318 provides for repeat executions of the block 316 until all of the parameters are copied across the domain boundary.

Next, block 320 generates a call for execution in the target domain. If the target domain is the Y domain, the simulator 104 is activated by the environment manager 102.

For the X-Y or Y-X call return, block 322 uses the jacketing tables in the manner described for the blocks 316 and 318 to copy return results to the calling domain state saved by the block 308. Finally, block 324 restores the calling state as modified, and code execution is resumed in the calling domain. Again, if the return domain is the Y domain, the simulator is activated by the environment manager 102. The Jacketing mechanisms herein are recursive and asynchronous-software trap (AST) reentrant.

CROSS-DOMAIN DATA JACKETING

Data references from the X domain to the Y domain require no special resolution since a common address space is employed in the preferred embodiment. Y code may freely reference data structures allocated in the Y image, but Y code cannot implicitly see privileged global data declarations in X routines, and jacketing is accordingly employed in the Y to X direction to provide the necessary linkage for a privileged Y data reference to the X domain.

The data jacket includes declarations of the symbolic name of the data structure and its size and, if desired, its access mode. Index values are employed in a manner like that employed for the jackets for routines.

In implementing a cross-domain data reference, the simulator 104 tries to use the index value for the privileged data reference and an X hardware access violation is generated due to an illegal address. A handler is activated within the simulator to confirm the need for cross-domain referencing and a read or write routine in the environment manager 102 calculates a target address in the X domain from the address of the data reference. The interface processing for cross-domain data references is an interface or "jacketing" function and is herein defined to be jacketing.

The data is next fetched or stored by the X operating system and a return is made to the simulator 104 with the data reference satisfied.

APPENDIX A

This declaration may be used in an X Out (*-VO.ALA or *-VOAI.ALA) or Y Out (*-AO.ALA or *-AOVI.ALA) description file.

A data declaration, given in an X Out description file, specifies that a variable by that name exists in the Y image and is to be made visible to the X image by means of a universal symbol specification in the Y linker options file (*-AL.OPT). Any and all data attributes are ignored.

A data declaration, given in a Y Out description file, specifies that a variable in the X image is to be made visible to the Y image. Any accesses to that variable from the Y image are transparently mapped to the storage in the X image.

No storage is allocated in the Jacketing tables to implement the described mapping; the actual storage must be allocated and named by a global symbol that can be referenced from the X image. (Usually the storage is allocated in the X image, but this is not necessary.)

If the ALIAS attribute is given, then the data is known by that name in the X image. If this attribute is not given, then an X name that is the same as the Y name is assumed.

If the SIZE attribute is given, then that number of bytes of storage in the Y image starting at the given Y name is mapped one-for-one to the same number of bytes in the X image. The size is rounded up to a multiple of eight bytes (to an integral number of quadwords). If this attribute is not given, then eight bytes (one quadword) is assumed.

If the ACCESS attribute is given, the fetch or store in the X domain will be preceded by a change mode operation to the given mode and followed by a change mode back to user mode. The application process must have the appropriate privileges for these change mode operations to succeed. If this attribute is not given, then user mode is assumed.

The total size of all data declarations for a single facility must not exceed 65K bytes.

X-TO-Y-CALL JACKET IMPLEMENTATION

Call jacket implementation may be best described by way of an example suppose that there is a routine named FOO that is contained in Y code and that we want to call this routine from X code. In the general case, where no standard calling conventions apply either on the calling or the callee side, or both, there are two problems to be solved:

1. The X call must actually be linked to a surrogate for the target Y routine that is able to apply the appropriate parameter transformations and initiate the transition to simulation of the Y code. That is, there must be a X routine whose name is FOO that can receive the call and "do the right thing. This leads to a second problem.
2. There must be some way for the surrogate X routine named FOO to refer to the Y routine named FOO. This cannot be achieved by exporting the Y name from the Y image as a universal symbol because that would lead to two symbols named FOO being involved in the link of the X image—one being the universal symbol from the Y image and the other being the surrogate X routine entry in the X image.

The second problem is solved by exporting a different but related symbol from the Y image rather than directly exporting the target symbol. The ALA compiler forms the related symbol by appending "_V" to the target symbol; that is, for the target routine named FOO, the symbol FOO_V is exported as a universal symbol from the Y image.

The symbol FOO_V is not, however, a synonym or alias for the real symbol FOO. Instead, it is the address of a quadword whose contents is the address of the procedure descriptor for the Y routine named FOO. That is, if external routine FOO;

is declared in the X Out and Y In description files, then the Y transfer vector file that is generated (*-AT.MAR) will include FOO_V:: .address FOO, and the Y options file that is generated (*-AL.OPT) will include universal=FOO_V This part of the mechanism thus provides a symbol (FOO_V) different from FOO that can be used by another (X) image to obtain the address of FOO in the Y image.

The first problem is solved by creating an X surrogate or stub routine named FOO whose sole function is to push the index of a jacket description data structure onto the X stack and then branch/jump to common code to interpret the data structure and complete the call. That is, if external routine FOO;

is declared in the X Out and Alpha In description files, then the X tables that are generated (*-VT.MAR) will include:

```
FOO::
    .mask    ^M< >              ! Omitted for a JSB call
    PUSHL    #FOO$V
    JMP      TH$V2A_JACKET
```

The jacketing tables proper (at index FOO$V) include an encoded version of the applicable linkage declaration that allows determination of where the X calling parameters are located, as well as where the target Y routine expects the parameters to be available. One of the entries in this data structure is, of course, a longword field that contains the address FOO_V. This reference is resolved by the universal symbol exported from the Y image.

For names that are longer than 29 characters, a compressed base name of 29 characters is created as follows: (1) remove underscored characters as needed working from right to left; (2) if the result is still too long, then remove vowels as needed working from right to left; (3) finally, if the result is still too long, truncate at the end.

Y-to-X Call Jacket Implementation—Jacketing calls from the Y to X code is a somewhat different problem:
1. The Y image is linked first, so it cannot directly reference any symbols in the X image that are linked later.
2. The nature of the Y call mechanism, involving distinct procedure descriptor and code addresses, makes it awkward to avoid Y data accesses to "bad memory" prior to actual call interception.

The solution mechanism has several parts. First, suppose the Y code contains a call to routine BAR which is going to be contained in a X image which can be in the main image or a shareable library image. The external symbol BAR is expected to be the address of the procedure descriptor for BAR.

In a normal Y link, when the linker encounters this situation, it will arrange for the Y image activator to fixup the call by actually reaching into and reading from the target image that contains the definition of symbol BAR. The contents of the location eight bytes after the defined value, which is the second quadword of the target procedure descriptor containing the target code address, is fetched and incorporated into the calling image.

In the case at hand, there is no other image that can supply a target code address from a location eight bytes after the symbol address because the target image is an X image and the symbol it will later define refers to the entry mask for the X procedure, not a procedure descriptor. Eight bytes following that symbol value is part of one or more real X instructions, which is not a likely source of a useful address.

The external symbol reference is resolved in this case using an Y linker options file that contains a symbol definition for each such routine. This options file (*-AL.OPT) is generated from the Y Out and X In description files by the jacketing compiler. Successive integer values are associated with each routine name so that the symbol value can later be used to index into the jacketing tables at run-time to locate the appropriate jacketing information.

The Y linker uses this symbol value as the definition for the target procedure value. Moreover, when linking for the preferred embodiment, the linker uses this same value for the target code address as well.

The mechanism so far described makes it possible to link the Y image without having undefined symbol errors. There remains to understand how the symbol values given in the options file actually serve to effect an Y-to-X call.

To make this possible, the simulator is coded to continue simulation so long as the addresses from which it is fetching instructions are known to be in an Y image. The valid address ranges used for this check are those supplied to the simulator at program initialization.

When the simulator is about to fetch an instruction that is not in the specified Y address range, it simply returns normally with the result that indicates this reason for completion.

The driver routine that initiated the simulation as the result of a X-to-Y call then checks to see if the next instruction to be fetched would be from the fake return address that it placed in the Y return address register prior to initiating simulation. If so, this is simply the return from the Y routine that was called, and there remains only to copy back the simulated Y state into the proper X registers and return from the call.

Otherwise, if the apparent next instruction to be fetched would be from an address that corresponds to the symbol definitions contained in the Y options file, then the Y code is assumed to be attempting to make an Y-to-X call. The apparent address is decoded to access the jacketing tables (*-VT.OBJs), which provide all of the needed details for making the Y call.

The symbol values used are encoded as follows;

| Bits | 0–15:  | Index within facility |
|---|---|---|
| Bits | 16–27: | Facility number |
| Bits | 28–31: | 12 (decimal) or C (hex) for routine declarations |
|      |        | 14 (decimal) or E (hex) for data declarations |

This encoding results in "addresses" in the S1 part of the X address space. Such addresses are never valid addresses in a X user mode process and thus will not be accidentally confused with any address that is valid.

Y-TO-X DATA JACKET IMPLEMENTATION

Y-to-X data jacketing, or data mapping, is similar in many ways to call jacketing. External symbol data references in the Y image are resolved by symbols in the Y options file (*_AL.OPT) that use special values encoded as already explained in the previous section.

When a simulated load or store to one of these locations is attempted, an access violation results. Simulator fields the exception and turns it into a call to a predetermined (at initialization) routine in the preferred embodiment with parameters indicating whether the operation attempted was a load or store, whether for a longword or quadword, and the address. The preferred embodiment "translates" the address using the jacket description tables into the "real" X address and carries out the operation. If the address cannot be translated, then the attempt fails—the handler returns a failure status and Mannequin terminates simulation. Similarly, if the translation succeeds but the access fails, then the simulation is also terminated. If the access succeeds, then the handler completes the write or returns the value read as appropriate, returns a success status and simulation continues.

AUTOMATIC JACKETING

The simplest case of jacketing between X and Y code occurs when both sides of the interface adhere to the standard calling sequence conventions on their respective platforms.

Of the two, a call from X to Y code is simplest of all—and is considered first.

Calling From X to Y—The design of the Y calling standard has two important characteristics that are especially important for the preferred embodiment:
  The value of a symbol associated with a procedure is conventionally the address of a procedure descriptor for that procedure rather than the address of the code for the procedure as such.
  The definition of a procedure descriptor is so arranged that bits 12 and 13 of the first word of the descriptor are not zero.

The combination of these two characteristics means that if X code makes a call to an address that is, in fact, the address of an Y procedure descriptor (that is, an address identified to the simulator as being within a Y image), then a reserved operand fault will occur. Thus, the X architecture requires that the target of a CALL instruction must be an entry mask in which bits 12 and 13 are zero.

An exception handler is provided to identify such an exception. It confirms that the source is a X call instruction and the destination if an Y procedure descriptor, and transforms the CALL into a call to a procedure that will convert the original X call into an appropriate Y call. If the exception does not satisfy these criteria, then the exception is resignaled.

X arguments on the stack are copied into the simulated Y registers and/or pushed onto the simulated Y stack. A distinguished (recognizable) return address is set up as the contents of the return address register, as though a Y call had just been made. Then the simulator is called to begin simulation of the target Y code.

The simulator is initialized with a set of address bounds information that allows it to check that the address of an instruction that is about to be fetched is within Y space. When this check fails, the simulation terminates normally. The return address mentioned above is chosen both to cause simulation to terminate and to be distinguishable form other reasons for termination. Other considerations can also lead to simulation termination as will be seen later.

Generally any error detected by the simulator results in "normal" termination of an on-going simulation. It is then up to the X environment to interpret the reason for that termination. In the case at hand, the special return value allows the X environment to recognize the reason for termination as simply completion of the Y call, and to turn that into a RETURN from the original X call.

AST Calling From X to Y—The described technique for calling from X to Y also works in many cases for an AST. That is, if the address of an Y procedure descriptor is passed as an AST routine address to an X system service, then when the AST is delivered, the reserved operand exception is caught and serviced as described above. The advantage of this is that it unnecessary to build special jacketing routines in order to call such system services from Y code.

Indirect Calling From Y to X—An indirect call is a call in which the target address of the call is computed, possibly using a table lookup or by being passed as a parameter. When this occurs in Y code, it is not possible to use the techniques described previously to map the target routine name to a special address. Indeed, for an indirect call, the target address might be either a Y routine or a X routine.

Indirect calls from Y code are made to work, even when the target routine might be in a X domain, using a special code generation convention in certain compilers. Indirect calls are always performed by invoking a run-time routine in a libots library named ots_call_pv[1]. The compilers available to operate as described include certain GEM_based compilers produced by the present assignee.

When compiled code is linked for the multi-architecture environment, an alternative version of the ots_call_pv is supplied. This routine tests bit 12 of the first word of the supposed Y target procedure descriptor to see if it is set. If so, then a normal Y computed call is completed. If it is not set, then it is assumed that the target address is really the address of a X call mask. Control is passed to the preferred embodiment to make a standard X call to the given address.

To obtain the same capability from assembly language, a normal indirect call

| LDA | R27, <procedure value> |
| LDQ | R26, 8(R27) |
| JSR | R26, (R26) | can be replaced with

| .EXTERN ots_call_pv | |
| ... | |
| LDA | R27, <procedure value> |
| LDA | R26, 8(R27) |
| JSR | R26, (R26) |

The only change is to replace the load of R26 from the second quadword of the target procedure descriptor with a load of the code address for ots_call_pv. The code address for the ots call_pv is loaded as opposed to a procedure value address; ots call_pv is invoked with a non-standard call and there is no associated procedure descriptor.

APPENDIX B

JACKET DESCRIPTION LANGUAGE—JDL

Ident Declaration—The following syntax is accepted as an identification declaration:

```
ident-declaration :=
    IDENT = quoted-string ;
```

The ident strings from the several input files of the jacket description compiler are combined to form a composite ident string that is used in the X jacketing tables output module. This ident string is formed as a+b|c/x+y|z where
 a is the ident within the X out description
 b is the ident within the X out user jacket description (if present)
 c is the ident within the Y in description
 x is the ident within the Y out description
 y is the ident within the Y out user jacket description (if present)
 z is the ident within the X in description.

If an .ALA file has no ident declaration, then "?" appears in the corresponding output tables module. If there is only an X out and Y in pair, or only a Y out/X in pair of inputs, then only that part of the above composite ident is used. When an incoming description file has no ident but the corresponding output description does, then the same ident is assumed for the input description.

Facility Declaration—the following syntax is accepted as a facility declaration:

```
facility-declaration :=
    FACILITY facility-name = number ;
``` where
 facility-name is a valid identifier
 number is a decimal number (without any sign).
 A number may also be written in decimal, hexadecimal or octal radix using, respectively:
 %D 'decimal-number'

%X 'hex-number'
%P 'octal-number'

If present, the facility declaration must occur before any other linkage or routine declarations. If not present, a facility number of 0 is assumed. If a facility declaration is given in an X Out or a Y In description, then the same declaration must occur in both. Similarly, if a facility declaration is given in a Y Out or In description, then the same declaration must occur in both. If both the X to Y and Y to X descriptions have a facility declaration, then the same declaration must occur in both.

The facility identifier is arbitrary and not used in any way. It should be chosen to be suggestive of the facility involved (the facility image name is an excellent choice when there is one).

The purpose of the facility declaration is to allow jacketing descriptions to be prepared for individual X images and independently compiled into the appropriate tables. Relevant jacketing object modules can then be combined at link-time with a using application as needed.

For this to work, it is necessary that a distinct facility number be used for each separately compiled description. The actual facility number used is unimportant so long as it is unique.

Linkage Declaration—The following syntax is accepted as a linkage declaration:

```
linkage-declaration :=
        LINKAGE linkage-definition , . . . ;
linkage-definition :=
        linkage-name =
                linkage-type { linkage-parameters }
                        { : linkage-option . . . }
linkage-type :=                  { JSB | CALL }
linkage-parameters :=
                ( { input-parameter-location , . . . }
                        { ; output-parameter-location , . . . } )
input-parameter-location :=
        { REGISTER = register-number   |
          STANDARD                     }
output-parameter-location :=
        REGISTER = register-number
linkage-option :=
        { GLOBAL         ( global-register-segment , . . . ) |
          PRESERVE       ( register-number , . . . )         |
          NOPRESERVE     ( register-number , . . . )         }
global-register-segment :=
```

Routine Declaration—The following syntax is accepted as a routine declaration:

```
    routine-declaration :=
        EXTERNAL ROUTINE routine-definition , . . . ;
    routine-definition :=
        routine-name { : routine-attribute . . . ) ;
```

The only routine attribute of interest here is a linkage name. If a linkage name is given, then the declaration of that linkage must occur earlier in the same description file. The predefined linkage names in the present embodiment are:
BLISS,
FORTRAN,
FORTRAN_SUB, and
FORTRAN_FUNC
these may be used without being declared.

Data Declaration—The following syntax is accepted as a data declaration:

```
    data-declaration :=
        EXTERNAL data definition , . . . ;
    data-definition :=
        name { : data-attribute . . . }
    data-attribute :=
    {   ALIAS       ( name )   |
        SIZE        ( number ) |
        ACCESS      ( mode )   }
    mode := ( USER | EXEC | SUPER | KERNEL }
```

This declaration may be used (will be accepted in an X Out (*-VO.ALA or §=VOAI.ALA) or Y Out (*-AO.ALA or *-AOVI.ALA) description file.

When a data declaration is given in an X Out description file, it specifies that a variable by that name exists in the Y image and is to be made visible to the Y image by means of a universal symbol specification in the Y linker options file (*-AL.OPT). Any and all data attributes are ignored.

When a data declaration is given in a Y Out description file, it specifies that a variable in the XS image is to be made visible to the Y image. Any accesses to that variable from the Y image are transparently mapped to the storage in the X image.

No storage is allocated in the jacketing tables to implement the described mapping; the actual storage must be allocated and named by a global symbol that can be referenced from the X image. Usually the storage is allocated in the X image, but this is not necessary.

If the ALIAS attribute is given, then the data is known by that name in the X image. If this attribute is not given, then an X name that is the same ass the Y name is assumed.

If the SIZE attribute is given, then that number of bytes of storage in the Y image starting at the given Y name is mapped one-for-one to the same number of bytes in the X image. The size is rounded up to a multiple of eight bytes (to an integral number of quadwords). If this attribute is not given, then eight bytes (one quadword) is assumed.

If the ACCESS attribute is given, then the fetch or store in the X domain will be preceded by a change mode operation to the given mode and followed by a change mode back to user mode. The process must have the appropriate privileges for these change mode operations to succeed. If this attribute is not given, then user mode is assumed.

The total size of all data declarations for a single facility must not exceed 65K bytes.

Various modifications and variations can be made in the improved system and method for jacketing cross-domain routine calls and data references in a multi-code execution and debugging system within a multi-architecture environment of the present invention by those skilled in the pertaining art without departing from the scope and spirit of the invention. It is accordingly intended that the present invention embrace such modifications and variations to the extent they come within the scope of the appended claims and their equivalents.

What is claimed is:

1. A computer system embodying a first hardware architecture and comprising:

A) a processor for executing a plurality of first routines each including at least one call complying with a first call convention characteristic of a first domain, said processor being operable to simulate a second computer hardware architecture for executing a plurality of second routines each including at least one call complying with a second calling convention characteristic of a second domain, each said call of a plurality of said first and second routines comprising a cross-domain call from one of said first and second domains comprising a calling domain to the other of said first and second domains comprising a called domain;

B) memory means for storing said first and second routines and a plurality of results of said first and second routines;

C) means for jacketing each said cross-domain call requesting service in said called domain, and for jacketing each said cross-domain call comprising a return including call results from said called domain after the requested service has been performed; said jacket means including i) means for transforming first jacketing information specifying a first set of parameters complying with the one of said first and second calling conventions that is characteristic of said calling domain into second jacketing information specifying a second set of parameters complying with the one of said first and second calling conventions that is characteristic of said called domain; said transforming means including jacket table means compiled from jacket description information for mapping said first set of parameters into said second set of parameters, and said second set of parameters into said first set of parameters; and ii) jacket memory means coupled with said jacket table means for storing said jacket description information for each said first and second routine that includes any of said cross-domain calls, said jacket description information stored in said jacket memory means including (a) an identification of call type, (b) an identification of said first and second parameters, (c) an identification of a call result memory location in which said call results of the cross-domain call can be stored, and (d) an identification of a routine memory location containing information to be preserved during said cross-domain call; and D) said processor being coupled with said transforming means and responsive to said second jacketing information for effecting said cross-domain calls after jacketing.

2. The jacketing system in accordance with claim 1, wherein said processor executes and debugs multiple codes comprising a plurality of X routines including said first routines, and said similating subsystem executes multiple codes comprising a plurality of Y routines including said second routines, and said cross-domain calls include a plurality of routine calls from X routines for execution of Y routines, and a plurality of routine calls from Y routines for execution of X routines.

3. The jacketing system in accordance with claim 1, wherein a plurality of said cross-domain calls include a plurality of said parameters to be passed to said called domain, said first call convention specifies a plurality of representations for parameters in said first domain, and said second call convention specifies a plurality of representations for parameters in said second domain that are different from the representation specified by said first call convention, and said transforming means transforms the representation of each said parameter to be passed from that specified by call convention of said calling domain to that specified by call convention of said call domain.

4. The jacketing system in accordance with claim 2,
A) wherein a plurality of said cross-domain calls include a plurality of said parameters to be passed to said called domain, said first call convention specifying a plurality of representations for parameters in said first domain, and said second call convention specifying a plurality of representations for parameters in said second domain that are different from the representations of said first call convention, and B) wherein said jacket information includes said parameters, and said transforming means transforms the representation of each said parameter to be passed from that specified by call convention of said calling domain to that specified by call convention of said called domain.

5. The jacketing system of claims 1 or 2 or 3 or 4 wherein data in said memory means is accessible from both said first and second domains, and said cross-domain calls that originate in said second domain include a plurality of data references that require memory access handling in said first domain.

6. The jacketing system of claim 4 wherein said jacket table means includes:
a first jacketing table coupled with said processor having a table entry for each said first routine in said first domain;
a second jacketing table coupled with said processor having a table entry for each said second routine in said second domain;
each of said first and second jacketing tables having a first jacket description file for calls from said calling domain to said called domain comprising outgoing calls and a second jacket description file for calls from said called domain to said calling domain comprising incoming calls; and
said first jacket file defining a plurality of references to a target routine and said second jacket file defining a plurality of expected references from a calling routine.

7. The jacketing system of claim 4 wherein said jacketing means further includes:
means for processing detected cross-domain calls at run-time, said processed calls including at least one routine call for execution of a called routine in said called domain, said called routine comprising one of said X and Y routines;
said processing means including means for operating said transforming means to generate a transformed representation of said processed routine call;
said transformed representation being transmitted by said transmitting means for execution of said called routine in said called domain.

8. The jacketing system of claim 6 wherein said jacketing means further includes:
means for processing detected cross-domain calls at run-time, said processed calls including a routine call for execution of a called routine in said called domain, said called routine comprising one of said X and Y routines;
said processing means including means for operating said transforming means to generate a transformed representation of said processed routine call;

said transformed representation being transmitted by said transmitting means for execution of said called routine in said called domain.

9. The jacketing system of claim 8 wherein said operating means references said jacketing tables to transform each said parameter in each processed routine call in accordance with the table entries for the calling and called routines.

10. The jacketing system of claims 6 or 7 wherein data in a memory included in said computer system is accessible from both said first and second domains, and said calls originating in said first domain include data references that require memory access handling in the second domain.

11. The jacketing system of claim 5 wherein said data references are reference to a plurality of privileged memory locations requiring X domain handling.

12. The jacketing system of claim 10 wherein said data references are reference to privileged memory locations requiring X domain handling.

13. A computer comprising:
A) an X domain characterized by an X hardware architecture and including a processor for executing a plurality of X routines complying with an X calling convention; said processor including a simulator for providing a Y domain characterized by a Y hardware architecture and being capable of executing a plurality of Y routines complying with a Y calling convention;
B) a program memory coupled with said processor for storing said X routines in a plurality of first program memory locations and for storing said Y routines in a plurality of second program memory locations, said Y routines including a plurality of call-containing routines each having a call for accessing said first memory locations using a Y set of calling parameters;
C) a first program compiler coupled with said memory for compiling said Y routines into corresponding first objects module files;
D) a jacket memory storing a plurality of first and second jacket descriptions complying respectively with said first and second calling conventions, said jacket descriptions stored in said jacket memory including (a) an identification of call type, (b) an identification of said first and second parameters, (c) an identification of a call result memory location in which said call results of the cross-domain call can be stored, and (d) an identification of a routine memory location containing information to be preserved during said cross-domain call; and
E) a jacket compiler coupled with said jacket memory for compiling said jacket descriptions into a jacket module file comprising a jacket table with entries corresponding to said first objects module files;
F) a linker coupled with said first program compiler and said jacket compiler for combining said first objects module files and said jacket module files into executable first image files, each said first image file having a first objects module portion and a jacket module portion; and
G) wherein, for each said first image file, said simulator can execute each said first objects module portion using said jacket module portion to obtain an X set of parameters corresponding to said Y set of parameters and complying with said X calling convention, whereby said simulator can access said target memory locations.

* * * * *